(12) United States Patent
Lee et al.

(10) Patent No.: US 10,360,664 B2
(45) Date of Patent: Jul. 23, 2019

(54) IMAGE PROCESSING APPARATUS AND METHOD USING MACHINE LEARNING

(71) Applicant: Postech Academy-Industry Foundation, Pohang-si (KR)

(72) Inventors: Seung Yong Lee, Pohang-si (KR); Hyeong Seok Son, Pohang-si (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 140 days.

(21) Appl. No.: 15/441,145

(22) Filed: Feb. 23, 2017

(65) Prior Publication Data

US 2018/0197278 A1    Jul. 12, 2018

(30) Foreign Application Priority Data

Jan. 12, 2017 (KR) .................. 10-2017-0005150

(51) Int. Cl.
| | |
|---|---|
| G06K 9/40 | (2006.01) |
| G06K 9/46 | (2006.01) |
| G06T 5/00 | (2006.01) |
| G06T 5/20 | (2006.01) |

(52) U.S. Cl.
CPC ............ *G06T 5/003* (2013.01); *G06K 9/40* (2013.01); *G06K 9/4609* (2013.01); *G06T 5/20* (2013.01); *G06T 2207/10024* (2013.01); *G06T 2207/20081* (2013.01); *G06T 2207/20084* (2013.01)

(58) Field of Classification Search
CPC . G06T 5/003; G06T 5/20; G06T 2007/10004; G06T 2207/20081; G06T 2207/20084; G06T 2207/20201; G06K 9/4609; G06K 9/66
See application file for complete search history.

(56) References Cited

U.S. PATENT DOCUMENTS

| | | | | |
|---|---|---|---|---|
| 8,818,091 B2* | 8/2014 | Zimmer | ............... | G06K 9/0061 348/222.1 |
| 8,823,745 B2* | 9/2014 | Francois | ............... | A63F 13/213 345/638 |
| 8,861,881 B2* | 10/2014 | Tate | ........................ | G06T 5/003 345/473 |
| 9,508,127 B1* | 11/2016 | Katsuhara | ............... | G06T 5/002 |

(Continued)

OTHER PUBLICATIONS

Sudderth et al. "Signal and Image Processing with Belief Propagation" IEEE Signal Processing Magazine vol. 114, Mar. 2008, pp. 1-7.*
Bruna, J. "Super Resoltution with Deep Convolutional Sufficient Statistics" ICLR Mar. 2016, pp. 1-17.*
Long et al. "Fully Covolutional Networks for Semantic Segmentation" UC Berkeley Proceedings of the IEEE (2015), pp. 1-10.*

(Continued)

*Primary Examiner* — Mia M Thomas
(74) *Attorney, Agent, or Firm* — Morgan, Lewis & Bockius LLP

(57) ABSTRACT

Disclosed are an image processing apparatus and an image processing method. The image processing method performed in the image processing apparatus comprises receiving a blurred image; generating an intermediate image from the blurred image, the intermediate image including artifacts with less sensitivity to changes in a blur kernel than the blurred image; and generating a first corrected image by removing the artifacts of the intermediate image using an artifact removal model. Therefore, it is made possible to learn how to remove artifacts of the intermediate image without the image processing apparatus learning a direct deconvolution method.

15 Claims, 12 Drawing Sheets

(56) References Cited

U.S. PATENT DOCUMENTS

| | | | |
|---|---|---|---|
| 9,530,079 B2* | 12/2016 | Ali | G06K 9/40 |
| 10,049,308 B1* | 8/2018 | Dhua | G06K 9/4628 |
| 10,083,499 B1* | 9/2018 | Milanfar | G06T 5/001 |
| 2006/0147101 A1* | 7/2006 | Zhang | G06T 7/0012 |
| | | | 382/131 |
| 2007/0217713 A1* | 9/2007 | Milanfar | G06T 3/4053 |
| | | | 382/299 |
| 2010/0189367 A1* | 7/2010 | van der Merwe | G06K 9/183 |
| | | | 382/217 |
| 2012/0045095 A1* | 2/2012 | Tate | G06T 5/003 |
| | | | 382/103 |
| 2012/0243783 A1* | 9/2012 | Zimmer | G06K 9/0061 |
| | | | 382/167 |
| 2014/0307950 A1* | 10/2014 | Jancsary | G06T 5/003 |
| | | | 382/154 |
| 2015/0078661 A1* | 3/2015 | Granados | G06T 5/009 |
| | | | 382/167 |
| 2015/0131898 A1* | 5/2015 | Schelten | G06T 5/003 |
| | | | 382/159 |
| 2016/0042513 A1* | 2/2016 | Yudovsky | G06F 19/321 |
| | | | 382/128 |
| 2017/0061249 A1* | 3/2017 | Estrada | G06T 7/344 |
| 2017/0061625 A1* | 3/2017 | Estrada | G06K 9/6267 |
| 2017/0177918 A1* | 6/2017 | Boshra | G06K 9/0002 |
| 2018/0075581 A1* | 3/2018 | Shi | G06T 3/4053 |

OTHER PUBLICATIONS

Schmidt, U., et al., "Discriminative Non-Blind Deblurring", IEEE, Conf. on Computer Vision and Pattern Recognition (CVPR), Jun. 2013, 8 pgs.

Schuler, C. et al, "A Machine Learning Approach for Non-Blind Image Deconvolution", IEEE Xplore, Computer Vision Foundation, 2013, pp. 1067-1074.

* cited by examiner

BLURRED TEST IMAGE

CLEAR TEST IMAGE

FIG. 11
| CONVOLUTIONAL NEURAL NETWORK STRUCTURE | PSNR(dB) |
|---|---|
| CONVOLUTIONAL NEURAL NETWORK SHOWN IN FIG. 4 | 27.26 |
| CONVOLUTIONAL NEURAL NETWORK SHOWN IN FIG. 5 | 29.42 |
| CONVOLUTIONAL NEURAL NETWORK SHOWN IN FIG. 6 | 29.58 |
| CONVOLUTIONAL NEURAL NETWORK SHOWN IN FIG. 7 | 29.85 |
FIG. 12A
FIG. 12B

IMAGE PROCESSING APPARATUS AND METHOD USING MACHINE LEARNING

CLAIM FOR PRIORITY

This application claims priority to Korean Patent Application No. 2017-0005150 filed on Jan. 12, 2017 in the Korean Intellectual Property Office (KIPO), the entire contents of which are hereby incorporated by reference.

BACKGROUND

1. Technical Field

The present disclosure relates to image processing apparatus and method, and more particularly, to image processing apparatus and method for correcting blurred images.

2. Related Art

A blurred image may be photographed by shaking or trembling of a photographing apparatus during image photographing. At this time, a blur kernel indicates a shaking path of the photographing apparatus. It is also called non-blind deconvolution to obtain a clear image when the blurred image and the blur kernel corresponding to the blurred image are given.

Meanwhile, since most of the blurred images include noise, it is a very difficult problem to solve the deconvolution problem in consideration of noise. In recent years, as deep learning techniques have evolved, attempts have been made to solve the deconvolution problem using deep learning techniques.

However, since the deconvolution method is largely changed according to influences of the noise and changes of the blur kernel as described above, the method using the deep learning techniques has also been limited in accuracy and calculation speed.

Accordingly, there is a demand for a technology capable of performing the deconvolution at a high speed irrespective of the type of the current blur kernel.

SUMMARY

Accordingly, exemplary embodiments of the present disclosure are provided to substantially obviate one or more problems due to limitations and disadvantages of the related art.

Exemplary embodiments of the present disclosure provide image processing method and apparatus. More specifically, the exemplary embodiments of the present disclosure provide image processing apparatus and method for obtaining clear images from blurred images.

Technical objects of the present disclosure are not limited to the aforementioned technical objects and other technical objects which are not mentioned will be apparently appreciated by those skilled in the art from the following description.

In order to achieve the above-described objective, an aspect of the present disclosure provides a machine learning method in which an image processing apparatus learns image processing. The method may comprise receiving a clear test image; generating an intermediate image from a blurred test image obtained from the clear test image, the intermediate image including artifacts with less sensitivity to changes in a blur kernel than the blurred test image; and generating an artifact removal model that removes artifacts of an image from a result of machine learning performed by using the intermediate image and the clear test image.

The method may further comprise generating the blurred test image from a sum of a convolution of the clear test image and the blur kernel and a noise.

The intermediate image may be obtained by applying a Wiener filter to the blurred test image.

The artifact removal model may be generated from the result of the machine learning using a convolutional neural network.

The convolutional neural network may include at least one convolution layer for generating a plurality of characteristic maps using a plurality of convolution filters.

The convolutional neural network may include at least one node for summing an output result of an intermediate layer of the convolutional neural network and an output result of a layer preceding the intermediate layer.

The convolutional neural network may include a node for summing an output result of a last layer of the convolutional neural network and data of the intermediate image input to the convolutional neural network.

In the generating the artifact removal model, a back propagation process of the convolutional neural network may be performed in consideration of a regularization term obtained from a gradient of an output result of the convolutional neural network.

In order to achieve the above-described objective, another aspect of the present disclosure provides an image processing method performed in an image processing apparatus. The method may comprise receiving a blurred image; generating an intermediate image from the blurred image, the intermediate image including artifacts with less sensitivity to changes in a blur kernel than the blurred image; and generating a first corrected image by removing the artifacts of the intermediate image using an artifact removal model.

The intermediate image may be obtained by applying a Wiener filter to the blurred test image.

The artifact removal model may remove the artifacts of the intermediate image by using a convolutional neural network.

The convolutional neural network may include at least one convolution layer for generating a plurality of characteristic maps using a plurality of convolution filters.

The convolutional neural network may include at least one node for summing an output result of an intermediate layer of the convolutional neural network and an output result of a layer preceding the intermediate layer.

The convolutional neural network may include a node for summing an output result of a last layer of the convolutional neural network and data of the intermediate image input to the convolutional neural network.

The method may further comprise generating a second corrected image which corrects detail of the first corrected image, wherein the second corrected image satisfies a condition of minimizing a linear sum of a squared error of the blurred image and a convolution of the second corrected image and the blur kernel, and a squared error of the first corrected image and the second corrected image.

In order to achieve the above-described objective, yet another aspect of the present disclosure provides an image processing apparatus deconvoluting a blurred image. The apparatus may comprise a processor; and a memory storing at least one instruction executed by the processor, wherein the at least one instruction is configured to generate, from the blurred image, an intermediate image including artifacts with less sensitivity to changes in a blur kernel than the blurred image; and generate a first corrected image by removing the artifacts of the intermediate image using an artifact removal model.

The at least one instruction may be further configured to receive a clear test image; generate, from a blurred test image modified from the clear test image, an intermediate training image with less sensitivity to changes in a blur kernel than the blurred test image; and generate the artifact removal model from a result of machine learning performed by using the intermediate training image and the clear test image.

The at least one instruction may be further configured to remove the artifacts of the intermediate image by using a convolutional neural network, and the convolutional neural network includes a node for summing an output result of a last layer of the convolutional neural network and data of the intermediate image input to the convolutional neural network.

The at least one instruction may be further configured to remove the artifacts of the intermediate image by using a convolutional neural network, and the convolutional neural network includes at least one node for summing an output result of an intermediate layer of the convolutional neural network and an output result of a layer preceding the intermediate layer.

The at least one instruction may be further configured to generate a second corrected image which corrects detail of the first corrected image, wherein the second corrected image satisfies a condition of minimizing a linear sum of a squared error of the blurred image and a convolution of the second corrected image and the blur kernel, and a squared error of the first corrected image and the second corrected image.

According to the disclosed embodiments, it is made possible to learn how to remove artifacts of an intermediate image without an image processing apparatus learning a direct deconvolution method. This feature facilitates machine learning of the image processing apparatus and can apply the results of the machine learning to images blurred by various blur kernels. Further, the structure of the convolutional neural network can be improved, and the accuracy of artifact removal can be enhanced. In addition, the quality of the deconvolution can be improved by correcting the detail of the image from which the artifacts are removed.

BRIEF DESCRIPTION OF DRAWINGS

Exemplary embodiments of the present disclosure will become more apparent by describing in detail exemplary embodiments of the present disclosure with reference to the accompanying drawings, in which:

FIG. 11 is a table showing comparison between artifact removal performances according to convolutional neural network structures;

FIGS. 12A to 12E illustrate images for explaining performance of an image processing method according to an exemplary embodiment of the present disclosure.

DESCRIPTION OF EXEMPLARY EMBODIMENTS

Figure 1:
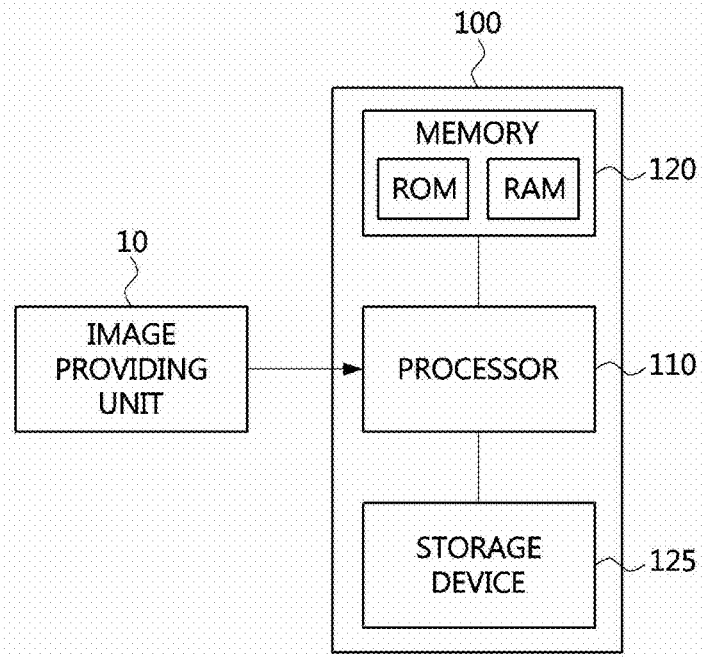
FIG. 1 is a block diagram illustrating an image processing apparatus according to an exemplary embodiment of the present disclosure.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Combinations of respective blocks in an accompanying block diagram and respective operations in a flowchart may be performed by computer program instructions. These computer program instructions can be mounted on a processor of a general purpose computer, a special purpose computer, or other programmable data processing equipment, and thus the instructions performed by the processor of the computer or other programmable data processing equipment generate a means for performing functions described in the respective blocks of the block diagram or the respective operations of the flowchart. To implement functions in a specific way, these computer program instructions can be stored in a computer-usable or computer-readable memory capable of aiming for a computer or other programmable data processing equipment, so that the instructions stored in the computer-usable or computer-readable memory can also produce a manufactured item including an instruction means for performing functions described in the respective blocks of the block diagram or the respective operations of the flowchart.

In addition, each block or operation may indicate a part of a module, a segment or a code including one or more executable instructions for executing specific logical function(s). It should be noted that mentioned functions described in blocks or operations can be executed out of order in some alternative embodiments. For example, two consecutively shown blocks or operations can be performed substantially at the same time, or can be performed in a reverse order according to the corresponding functions.

Hereinafter, exemplary embodiments according to the present disclosure will be described in detail by referring to accompanying drawings. However, the exemplary embodiments according to the present disclosure may be changed into various forms, and thus the scope of the present disclosure is not limited to the exemplary embodiments which will be described. The exemplary embodiments are provided to assist the one of ordinary skill in the art. in gaining a comprehensive understanding of the methods, apparatuses, and/or systems described herein.

In the present specification, a 'blurred image' may mean an image whose quality has deteriorated due to shaking of a photographing apparatus during photographing. An image processing apparatus according to exemplary embodiments of the present disclosure receives a blurred image and corrects the blurred image to obtain a clear image. Also, 'artifact' refers to the noise that appears in an image by artificial image processing. For example, the noise contained in the blurred image may be amplified during image processing of the blurred image, and the amplified noise may correspond to the artifact. A 'test image' means an image used by the image processing apparatus as training data for learning a deep learning algorithm. Test images may be included in a database for learning. The test image may include a clear test image. In case that the test image contains only a clear test image, the image processing apparatus may produce a blurred test image that is sharp but artificially blurred. The image processing apparatus may utilize the clear test image and the blurred test image for supervised learning. As another example, both clear test images and blurred test images may be provided as training images and input to the image processing apparatus.

The image processing apparatus may learn how to correct a blurred test image by using the blurred test images and the clear test images.

FIG. 1 is a block diagram illustrating an image processing apparatus according to an exemplary embodiment of the present disclosure.

Referring to FIG. 1, an image processing apparatus 100 according to an exemplary embodiment may include at least one processor 110, a memory 120, a storage device 125, and the like.

The processor 110 may execute program instructions stored in the memory 120 and/or the storage device 125. The processor 110 may refer to a central processing unit (CPU), a graphics processing unit (GPU), or a dedicated processor on which the methods according to the present disclosure are performed. The memory 120 and the storage device 125 may be composed of a volatile storage medium and/or a non-volatile storage medium. For example, the memory 120 may be comprised of a read only memory (ROM) and/or a random access memory (RAM).

The memory 120 may be storing at least one instruction executed by the processor 110. The memory 120 may store instructions for performing an image processing method learned by the processor 110. The processor 110 may update instructions stored in the memory 120 by machine learning. The machine learning performed by the processor 110 may be performed through a supervised learning method.

The processor 110 may receive an image from an image providing unit 10 in accordance with the instruction stored in the memory 120. Here, the image providing unit 10 may be a photographing apparatus. The image providing unit 10 may transmit the photographed image to the processor 110.

As another example, the image providing unit 10 may receive an image from a user and transmit the received image to the processor 110.

The processor 110 may process the image received from the image providing unit 10 to improve the quality of the image. For example, the processor 110 may remove blur and noise from the image.

A blurred image may be expressed by a below equation 1.

$$y = x * v + n \quad \text{[Equation 1]}$$

In the equation 1, 'y' denotes a blurred image, 'x' denotes a clear image, and 'n' denotes noise. Also, 'v' means a blur kernel, and means a convolution operator. The blur kernel v may be determined by a shaking path of the photographing apparatus that photographed the blurred image y.

Referring to the equation 1, the blurred image y may be represented by a sum of the noise n and a convolution operation result of the clear image x and the blur kernel v. The image processing apparatus 100 may obtain the clear image x from the blur kernel v and the blurred image y, and this process is called a deconvolution as described above. However, deconvolution has two difficulties. First, due to the noise n included in the blurred image, there may be very many solutions of the clear image x for a single blur kernel v. Therefore, the considerable amount of time and calculation may be required to calculate the clear image x directly from the blurred image y. Second, the blurred image y may vary according to the blur kernel v. It may be difficult to learn a general deconvolution method because the image processing process should vary according to the blur kernel v. For example, even if a deconvolution model is generated from an image blurred by a specific blur kernel, applying the generated model to an image blurred by another blur kernel may make it difficult to achieve the desired result.

Hereinafter, a process in which the image processing apparatus 100 according to the exemplary embodiment of the present disclosure learns an image processing method will be described.

Figure 2:
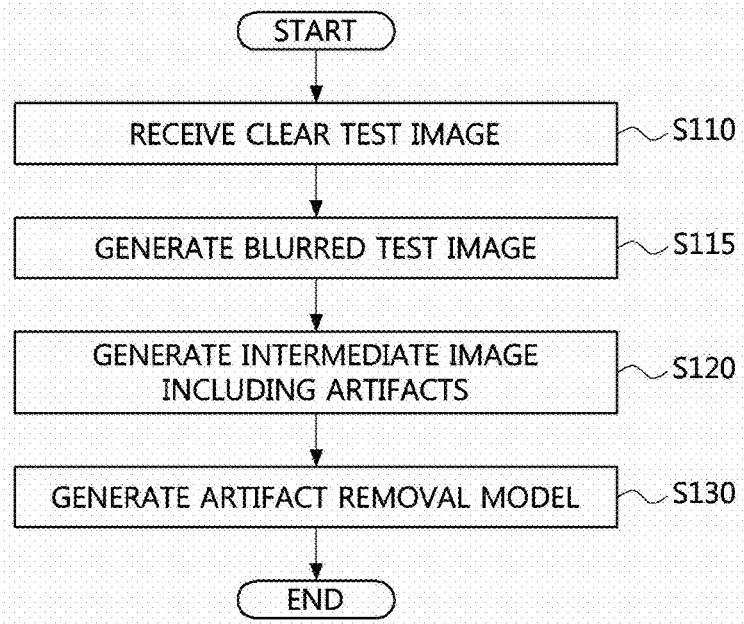
FIG. 2 is a flow chart explaining a machine learning method of an image processing apparatus according to an exemplary embodiment of the present disclosure.

FIG. 2 is a flow chart explaining a machine learning method of an image processing apparatus according to an exemplary embodiment of the present disclosure.

Referring to FIG. 2, in a step S110, the image processing apparatus 100 may receive a clear test image. In a step S115, the processor 110 may artificially process a clear test image to generate a blurred test image. That is, the processor 110 may convolute the blur kernel to the clear test image and add noise to create the blurred test image, and the processor 110 may generate the blurred test image using Gaussian random noise.

In the step S115, the processor 110 may generate the blurred test image using various types of blur kernels. The processor 110 may generate a plurality of blurred test images, which are used for machine learning.

The processor 110 may store the clear test image and the blurred test image in the memory 120. The processor 110 may use the clear test image and the blurred test image stored in the memory 120 as training data.

Although FIG. 2 illustrates an example in which a blurred test image is artificially generated by the processor 110 of the image processing apparatus 100, various embodiments of the present disclosure are not limited thereto. For example, the image processing apparatus 100 may receive both a clear test image and a blurred test image as learning data. In this case, the step S115 may be omitted.

Figure 3A:
FIGS. 3A and 3B illustrate a comparison between a clear test image and a blurred test image.
Figure 3B:

FIGS. 3A and 3B illustrate a comparison between a clear test image and a blurred test image.

FIG. 3A shows a blurred test image including blurring effects and noises, and FIG. 3B shows a clear test image with no blurring effects and noises. Blurred test images and clear test images may be used for machine learning of artificial neural networks.

The processor 110 may use the artificial neural network to process the blurred test image and compare the processing result with the clear test image. The processor 110 may compare the processing result of the artificial neural network with the clear test image and train the artificial neural network so that the processing result becomes close to the clear test image. The artificial neural network may include a convolutional neural network which will be described later.

Referring again to FIG. 2, in a step 120, the processor 110 may generate an intermediate image containing artifacts from the blurred test image.

The processor 110 may generate the intermediate image by an image processing process that is relatively simple in operation process than a complete deconvolution process. The processor may generate the intermediate image from the blur kernel of the blurred test image and the blurred test image.

The intermediate image may be an image with almost no blurring caused by the blur kernel in the blurred test image. However, the intermediate image may include artifacts of amplified noises included in the blurred test image. The artifacts may be generated in the process of generating the intermediate image.

As described above, the blurred test image may be changed sensitively as the blur kernel changes. This may make it difficult for the processor 110 to directly deconvolute the blurred test image. However, the process in which the processor 110 generates the intermediate image including the artifacts may be relatively simple as compared to the deconvolution process. Also, the artifacts contained in the intermediate image may be less sensitive to changes in the blur kernel than the blurred test image. For example, when the blur kernel is changed in the same way, the change in the artifacts included in the intermediate image may be smaller than the change in the blurred test image.

In a step S130, the processor 110 may learn an artifact removal model for to removing the artifacts from the intermediate image by comparing the intermediate image with the clear test image. The artifact removal model may be applied to remove artifacts of other images containing the artifacts. The processor 110 may generate the artifact removal model by training the artificial neural network by machine learning. The processor 110 may then use the generated artifact removal model to remove artifacts contained in any other images.

As shown in FIG. 2, the processor 110 may learn how to remove the artifacts of the intermediate image which has been processed from the blurred image, without learning how to deconvolute the blurred image directly. Since the artifacts are less sensitive to changes in the blur kernel, the processor 110 may not have to learn blurred images by all of the blur kernels.

The artifact removal model may be utilized to deconvolute the blurred images by various blur kernels. For example, the processor 110 may generate an intermediate image from a blurred image to be deconvoluted and then obtain a clear image by removing artifacts of the intermediate image using a previously learned artifact removal model. The process by which the processor 110 utilizes the artifact removal model to obtain a clear image will be described in detail later.

For example, the processor 110 may generate the intermediate image by applying a Wiener Filter to the blurred test image. The Wiener filter is a filter designed to minimize the mean square error of the outputs of the filter and expected desirable outputs of the filter, and is used as a technical means for image correction. The processor 110 may use the Wiener filter to create the intermediate image that contains artifacts.

However, the above-described example is merely illustrative, and various embodiments are not limited thereto. For example, the processor 110 may use L2 regularization deconvolution (C J Schuler, H C Burger, S. Harmeling, and B. Scholkopf, 'A machine learning approach for non-blind image deconvolution', In Proc. CVPR, 2013) may be used to generate the intermediate image.

The processor 110 may create an artifact removal model using a convolutional neural network. The processor 110 may use the convolutional neural network to learn how to remove artifacts from the intermediate image. The artifact removal model that the processor 110 has learned may be used to remove artifacts contained in other images.

Figure 4:
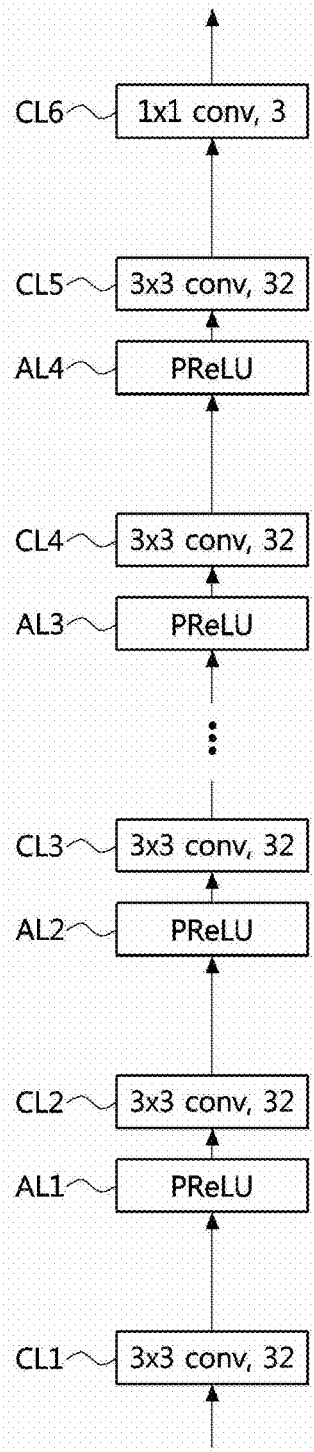
FIG. 4 is a conceptual diagram illustrating an example of a convolutional neural network.

FIG. 4 is a conceptual diagram illustrating an example of a convolutional neural network.

Referring to FIG. 4, the convolutional neural network may comprise convolution layers CL1, CL2, CL3, CL4, CL5, and CL6 for generating a plurality of characteristic maps using convolutional filters, and activation layers AL1, AL2, AL3, and AL4 that adjust weights of the convolution filters.

The convolution layers CL1, CL2, CL3, CL4, CL5, and CL6 may each include a plurality of nodes. The first convolution layer CL1 may generate characteristic maps using different convolution filters. The nodes of the first convolution layer CL1 may receive the intermediate image containing artifacts and convolute the intermediate image to generate characteristic maps by using the convolution filters. The characteristic maps generated by the nodes of the first convolution layer CL1 may be input to the first activation layer AL1.

The first activation layer AL1 may impart nonlinear characteristics to the output result of the first convolution layer CL1. The convolutional network may learn non-linear functions or parameters using the activation layers AL1, AL2, AL3, and AL4. The activation layers AL1, AL2, AL3, and AL4 may utilize an activation function. The activation function may include, but is not limited to, a sigmoid function, a Rectified Linear Unit (RELU) function, and the like.

The convolutional neural network may determine the weights of nodes included in each of the convolutional layers. The nodes included in each of the convolutional layers may generate characteristic maps using different convolutional filters. The convolutional neural network may adjust the weights of the convolution filters to generate characteristic maps by adjusting the weights of the nodes.

The processor 110 may change the weights of the nodes included in each of the convolution layers by supervised learning. For example, the processor 110 may compare the output result using the input intermediate image with the clear test image, and use the result as feedback information. The convolutional neural network may change the weights of the nodes of each of the convolutional layers based on the feedback information so that the output of the convolutional neural network approaches the clear test image. For example, the processor 110 may change the weights of the nodes included in the sixth convolution layer CL6 based on the feedback information. As the weights of the nodes included in the sixth convolution layer CL6 are changed, the feedback information may be changed. The processor 110 may change the weights of the nodes included in the fifth convolution layer CL5 using the changed feedback information. The processor 110 may change the weights of the nodes included in the fourth convolution layer CL4 using the changed feedback information while changing the weights of the nodes included in the fifth convolution layer CL5. In the same manner, the processor 110 may sequentially change weights of nodes included in the third convolution layer CL3, the second convolution layer CL2, and the first convolution layer CL1.

The processor 110 may repeat the process of changing the weights of the nodes included in the convolution layers CL1, CL2, CL3, CL4, CL5, and CL6 using the intermediate images generated from the plurality of blurred test images. As described above, the process in which the processor 110 changes the weights of the nodes included in the convolution layers CL1, CL2, CL3, CL4, CL5, and CL6 may be referred to as a 'back propagation process'.

The processor 110 may learn the convolutional neural network through the back propagation process. The processor 110 may generate an artifact removal model from the machine learning results of the convolutional neural network.

The structure of the convolutional neural network utilized by the processor 110 is not limited to the exemplary embodiment shown in FIG. 4.

Figure 5:
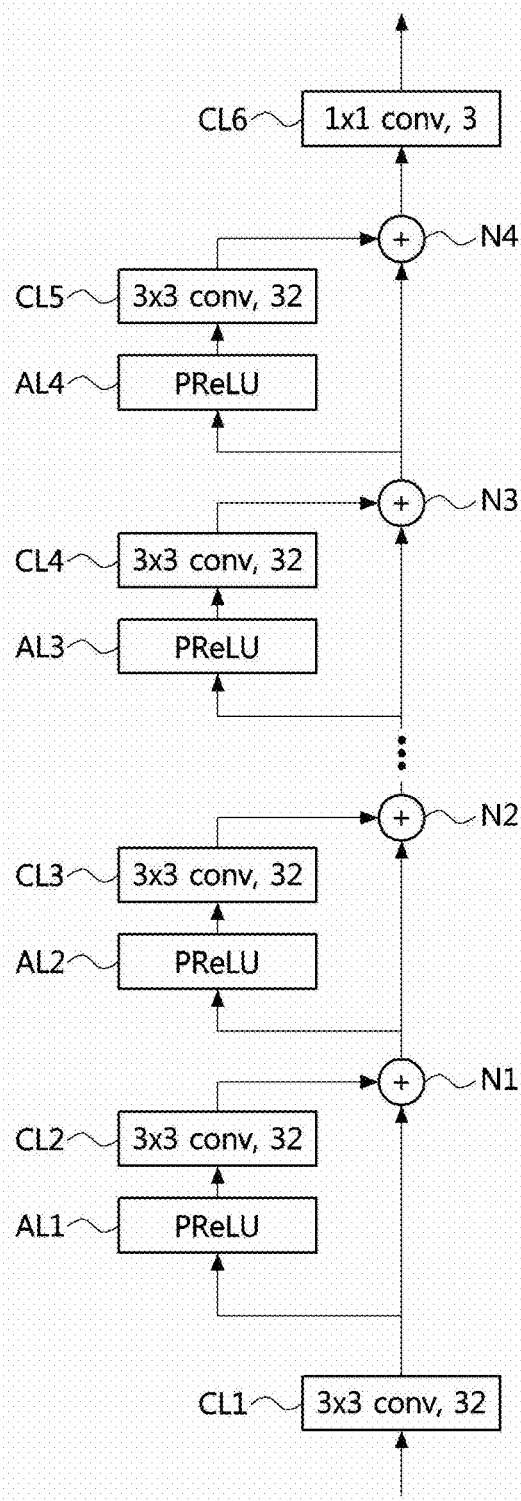
FIG. 5 is a conceptual diagram illustrating another example of a convolutional neural network.

FIG. 5 is a conceptual diagram illustrating another example of a convolutional neural network.

Referring to FIG. 5, a convolutional neural network may include nodes N1, N2, N3, and N4 for summing an output result of an intermediate layer with an output result of a layer ahead of the intermediate layer. For example, the first node N1 may sum the output result of the second convolution layer CL2 and the output result of the first convolution layer CL1 preceding the second convolution layer CL2. The result of the summing of the first node N1 may be input to the second activation layer AL2.

As shown in FIG. 4, when the number of layers is simply increased, a residual occurring between the layers may not be utilized as feedback information. Accordingly, when the convolutional neural network processes the intermediate image, if distortion occurs in any one of the layers, distortion may accumulate and result in erroneous output. On the contrary, as shown in FIG. 5, when a convolutional neural network includes a node for summing an output result of an intermediate layer and an output result of a layer ahead of the intermediate layer, a residual occurring between the layers may be reflected to the feedback information. Therefore, the distortion occurring in the layers may be suppressed, and the output result of the convolutional neural network can be more accurate.

Figure 6:
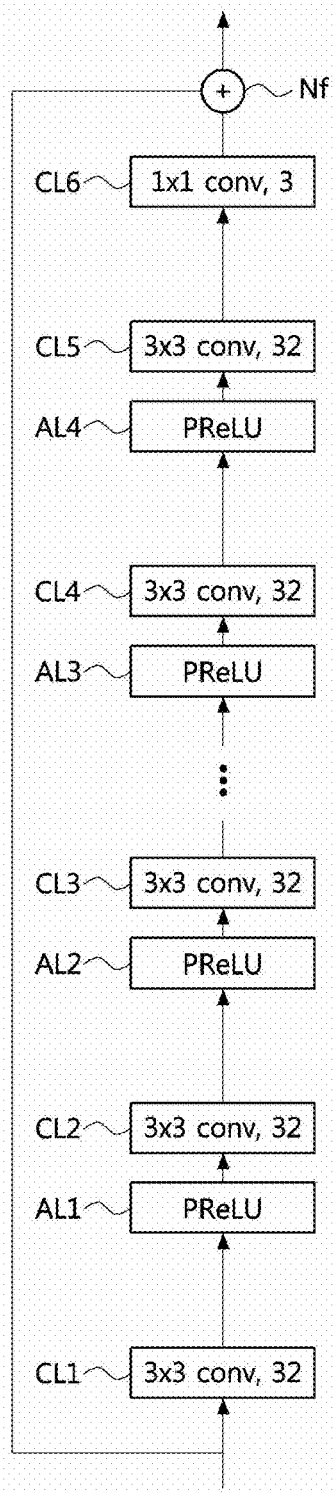
FIG. 6 is a conceptual diagram illustrating yet another example of a convolutional neural network.

FIG. 6 is a conceptual diagram illustrating yet another example of a convolutional neural network.

Referring to FIG. 6, a convolutional neural network may include a node Nf for summing an output result of a last layer and data of the intermediate image input to the convolutional neural network. The node Nf sums up the output result of the last layer and the data of the intermediate image so that the image output from the convolutional neural network may preserve overall color fidelity of the intermediate image. This makes the output of the convolutional neural network more accurate.

Figure 7:
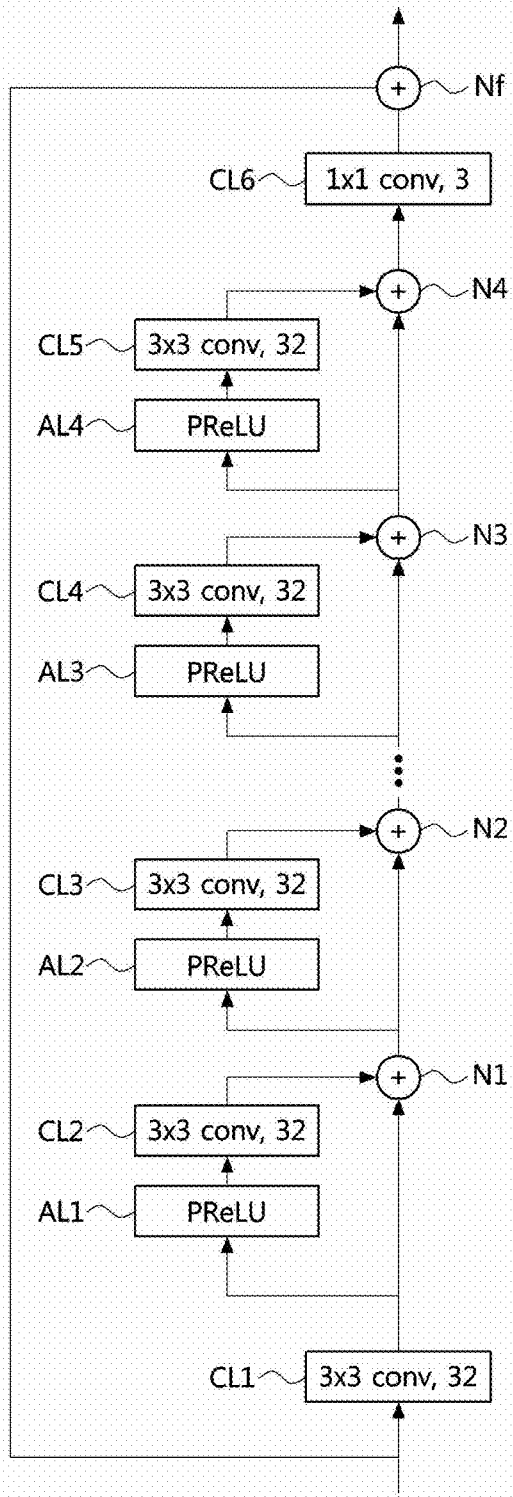
FIG. 7 is a conceptual diagram illustrating yet another example of a convolutional neural network.

FIG. 7 is a conceptual diagram illustrating yet another example of a convolutional neural network.

Referring to FIG. 7, a convolutional neural network may include nodes N1, N2, N3, and N4 for summing an output result of an intermediate layer with an output result of a layer ahead of the intermediate layer. In addition, the convolutional neural network may include a node Nf that sums an output result of a last layer with data of the intermediate image input to the convolutional neural network. The nodes N1, N2, N3, and N4 may reflect residuals occurring between layers, thereby suppressing a distortion phenomenon that may occur in the intermediate layers. Also, the node Nf may re-sum the data of the intermediate image input to the convolutional neural network to the final result so that the image output from the convolutional neural network can maintain overall color fidelity of the intermediate image.

The processor 110 may calculate a mean squared error (MSE) between the output result of the convolutional neural network and the clear test image, and utilize it as feedback information. The processor 110 may perform a back propagation process using the feedback information. The processor 110 may sequentially change the weights of the nodes included in the layers CL6 to CL1 of the convolutional neural network using the feedback information.

However, if the processor 110 uses only the mean square error as the feedback information, an overfitting phenomenon may occur. The overfitting phenomenon is a phenomenon in which machine learning is overly concentrated on the data used in learning, resulting in a loss of generality. For example, when the overfitting phenomenon occurs, the convolutional neural network may perform fairly well in removing artifacts from the images used in training, but artifacts contained in other images may not be effectively removed.

In order to prevent such the phenomenon, the processor 110 may perform a back propagation process considering further a regularization term.

The feedback information used by the processor 110 in the back propagation process may be expressed by a below equation 2.

$$FB = \tfrac{1}{2}\|x - f(y)\|^2 + \alpha R(f(y)) \qquad \text{[Equation 2]}$$

In the equation 2, 'FB' denotes a feedback term used in the back propagation process, 'x' denotes a clear test image, 'y' denotes a blurred test image, 'f(y)' denotes an output of the convolutional neural network obtained when the intermediate image generated from the blurred test image is input to the convolutional neural network, 'R(f(y))' denotes a regularization term, and '$\alpha$' denotes the weight of the regularization term.

The first term of the equation 2 corresponds to the above-mentioned MSE. When a is set to 0, the processor 110 may perform the back propagation process by considering only the MSE. The processor 110 may perform the back propagation process by considering only the MSE, but may further consider a regularization term by setting a to a value greater than zero.

The regularization term shown in the equation 2 may be defined by a below equation 3.

$$R(f(y)) = \|\nabla f(y)\|^p \qquad \text{[Equation 3]}$$

In the equation 3, the 'y' denotes the blurred test image, and the 'f(y)' denotes the output result of the convolutional neural network when the intermediate image generated from the blurred test image y is input to the convolutional neural network. The 'R(f(y))' denotes the regularization term, and the '$\nabla f$' denotes a gradient of f. 'p' is a parameter indicating the degree of scarcity of the gradient and may have a value of about 0.8. However, the presented value is merely illustrative, and the value of p may be set differently depending on the developer.

The regularization term R(f(y)) shown in the equation 3 may make the gradient of the output image of the convolutional neural network sparse. Generally, a clear image may have a rarity of gradients. The processor 110 may reflect the regularization term R(f(y)) to the back propagation process so that the output image of the convolutional neural network has the general characteristics of a clear image.

The processor 110 may change the weights of the nodes of the convolution layer in the convolutional neural network using the regularization term R(f(y)). Through this, the convolutional neural network may output images with gradients that are rare, even if an uneducated type of image is input to the convolutional neural network. It is made possible to suppress the above-mentioned overfitting phenomenon by making the gradient of the output image of the convolutional neural network scarce.

Since an actual image is discrete in pixel units while the gradient operation in the equation 3 is an operation defined for the continuous function, it may be necessary to redefine the gradient operation in the equation 3. Illustratively, the gradient operation of the equation 3 may be defined according to a below equation 4.

$$\frac{\partial \|\nabla f\|^p}{\partial f_{i,j}} = \sum_{k,l \in \{-1,+1\}} p|f_{i,j} - f_{i+k,j+l}|^{p-1} \qquad \text{[Equation 4]}$$

In the equation 4, denotes a gradient of the image f, and 'p' is a parameter indicating the degree of scarcity of the gradient, and may have a value of about 0.8. However, the presented values is merely illustrative, and the value of p may be set differently depending on the developer. Also, 'i' and 'j' are indexes indicating the position of the pixels.

Referring to the equation 4, the gradient of the image f at a pixel (i, j) may be defined as a difference between a pixel value at the coordinate (i, j) and a pixel value at the coordinate (i+k, j+k) adjacent to the coordinate (i, j).

The machine learning method of the image processing apparatus 100 has been described above. According to the above-described embodiments, the image processing apparatus 100 may generate an intermediate image including artifacts from a blurred test image, and learn an artifact removal method for removing the artifacts of the intermediate image. According to the embodiments, the image processing apparatus 100 may learn a method of eliminating the artifacts of the intermediate image without learning a method of directly correcting the blurred image into a clear image. Thus, the machine learning process is facilitated, and the machine learning result may be used for deconvolution of images blurred by various blur kernels.

Hereinafter, a method of processing an image by the image processing apparatus 100 using the above-described machine learning result will be described. The image processing apparatus 100 may receive a blurred image and output a clear image.

Figure 8:
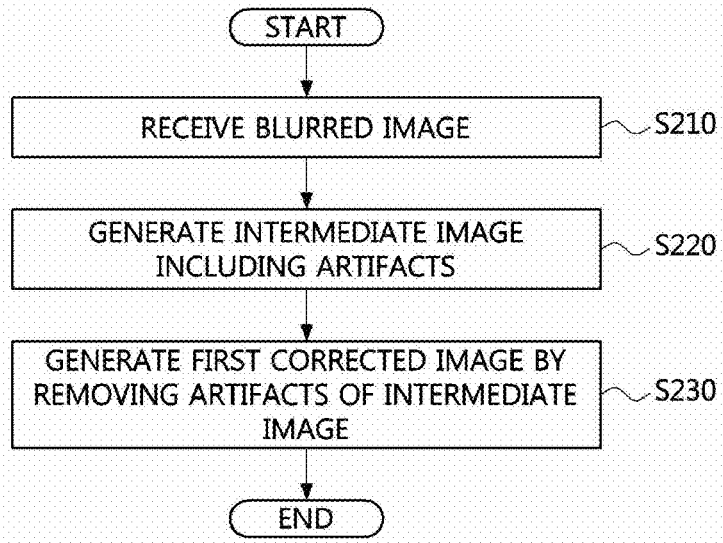
FIG. 8 is a flowchart explaining an example of a method of processing an image by an image processing apparatus.

FIG. 8 is a flowchart explaining an example of a method of processing an image by an image processing apparatus.

Referring to FIG. 8, in a step S210, the image processing apparatus 100 may receive a blurred image from the image providing unit 10. The image processing apparatus 100 may also receive a blur kernel of the blurred image.

In a step S220, the processor 110 may generate an intermediate image from the blurred image and the blur kernel of the blurred image. The intermediate image may include artifacts. The artifacts may be less sensitive to changes of the blur kernel than those of the blurred image.

The processor 110 may generate the intermediate image from the blurred image using a Wiener filter. As another example, the processor 110 may generate the intermediate image using L2 regularization deconvolution or the like.

In a step S230, the processor 110 may generate a first corrected image by removing the artifacts of the intermediate image using a previously learned artifact removal model. The first corrected image may have better image quality than the intermediate image. The processor 110 may remove the artifacts of the intermediate image using the convolutional neural network. The processor 110 may remove the artifacts of the intermediate image using at least one of the convolutional neural networks described with reference to FIGS. 4 to 7.

The convolutional neural network may include nodes N1, N2, N3, and N4 for summing the output result of the intermediate layer with the output result of the layer ahead of the intermediate layer.

The convolutional neural network may include a node Nf for summing the output of the last layer of the convolutional neural network and the data of the intermediate image input to the convolutional neural network.

The processor 110 may terminate the deconvolution process in the step S230. As another example, the processor 110 may further increase deconvolution quality through additional post-processing which will be described later.

Figure 9:
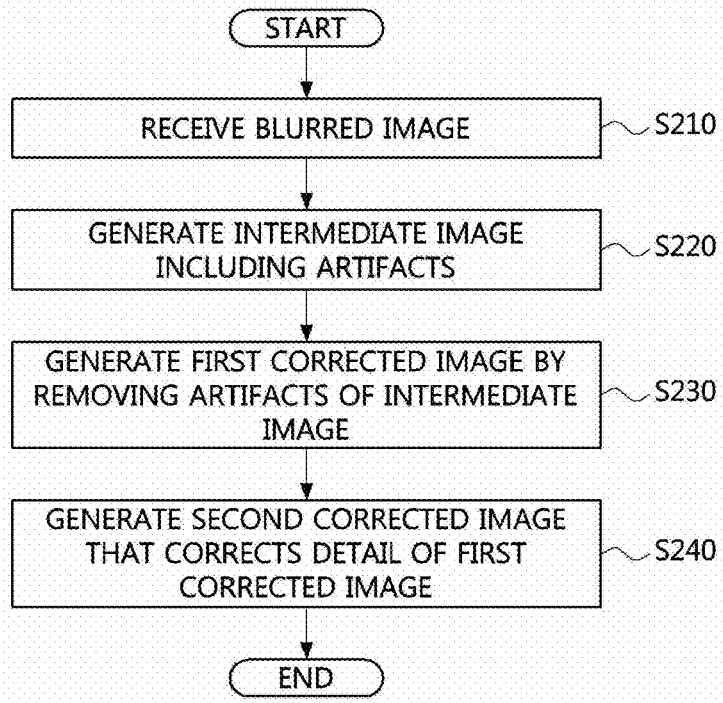
FIG. 9 is a flowchart illustrating another example of a method of processing an image by an image processing apparatus.

FIG. 9 is a flowchart illustrating another example of a method of processing an image by an image processing apparatus.

In the following description of the embodiment illustrated in FIG. 9, the description overlapping with that of FIG. 8 is omitted.

Referring to FIG. 9, in a step S240, the processor 110 may generate a second corrected image that has corrected the details of the first corrected image.

The processor 110 may generate the second corrected image such that a linear sum of a squared error between the second corrected image and the blurred image and a squared error between the first corrected image and the second corrected image is minimized.

The second corrected image may be determined by a below equation 5.

$$\arg\min_{x} \|y_1 - v*x\|^2 + \lambda \|y_2 - x\|^2 \qquad \text{[Equation 5]}$$

In the equation 5, 'x' denotes the second corrected image, '$y_1$' denotes the blurred image input to the image processing apparatus 100, 'v' denotes the blur kernel, and '$y_2$' denotes the first corrected image output from the convolutional neural network. 'λ' is a parameter that controls the ratio of the two squared error terms and is a real number greater than zero.

In the equation 5, $\|y_1 - v*x\|^2$ represents a squared error (referred to as 'first squared error') between the convolution of the second corrected image x and the blur kernel v and the blurred image $y_1$. The smaller the first squared error, the closer the convolution of the second corrected image x and the blur kernel v is to the blurred image $y_1$. That is, the smaller the first squared error, the more the blur effect may be removed in the second corrected image.

In the equation 5, $\|y_2 - x\|^2$ represents a square error (referred to as 'second squared error') between the first corrected image $y_1$ and the second corrected image $y_2$. The smaller the second squared error, the better the output of the convolutional network is preserved in the second corrected image.

The processor 110 may improve the quality of the second corrected image by generating the second corrected image such that the linear sum of the two squared errors is minimized.

The equation 5 may be solved more easily in the Fourier domain. The equation 5 may be expressed in the Fourier domain as shown in a below equation 6.

$$\hat{X} = \frac{\overline{V} \odot Y_1 + \lambda Y_2}{|V^2| + \lambda} \qquad \text{[Equation 6]}$$

In the equation 6, 'X', 'V', '$Y_1$', and '$Y_2$' represent the results of Fourier transform of x, v, $y_1$, and $y_2$ in the equation 5. '$\overline{V}$' represents a conjugate of V, and '$\hat{X}$' represents X satisfying the condition of the equation 5. Also, '$\odot$' denotes an element-wise multiplication operator.

The processor 110 may increase the accuracy of the deconvolution by obtaining the second corrected image from the equation 6.

Figure 10:
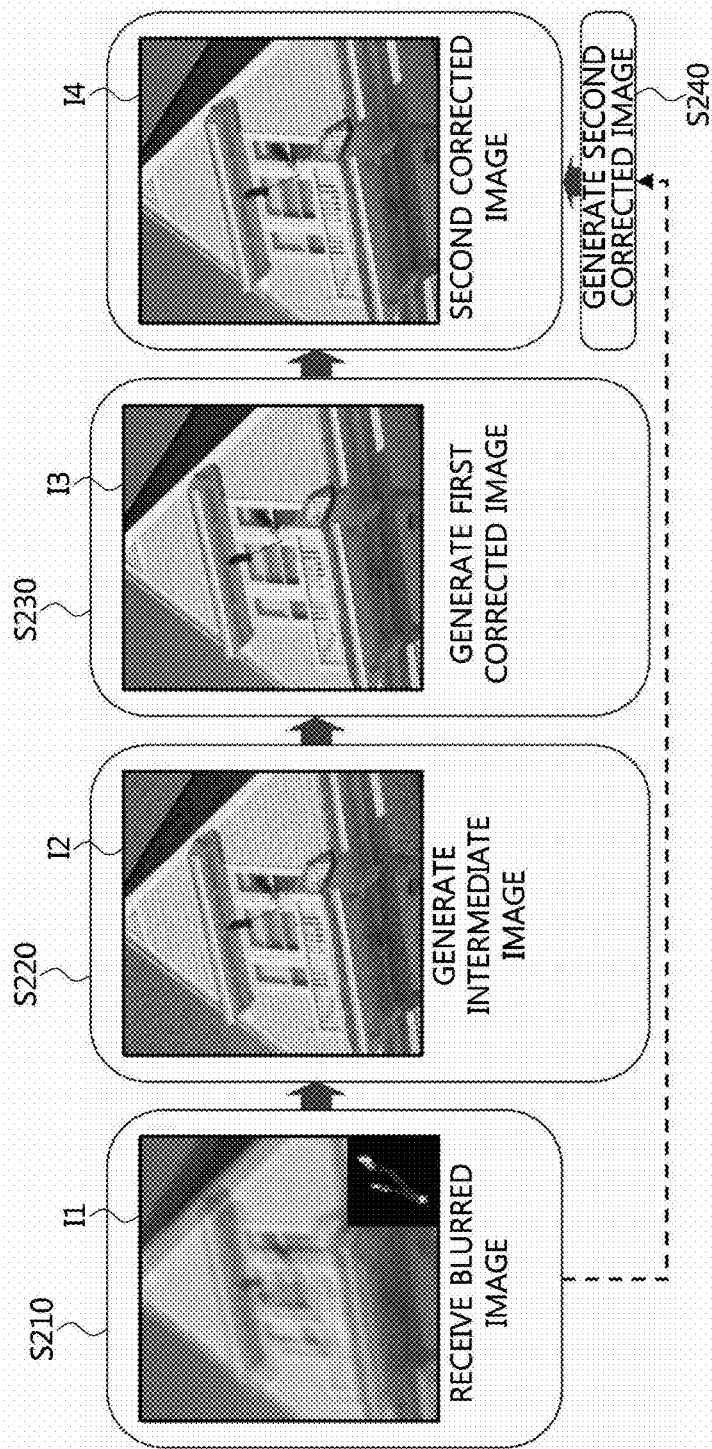
FIG. 10 is a conceptual diagram illustrating a process of deconvoluting a blurred image by an image processing apparatus.

FIG. 10 is a conceptual diagram illustrating a process of deconvoluting a blurred image by an image processing apparatus.

In a step S210, the image processing apparatus 100 may receive a blurred image I1 for which restoration is required.

In the step S220, the processor 110 may generate an intermediate image I2 from the blurred image I1. The intermediate image I2 is clearer than the blurred image I1, but additional image processing may be required since it includes artifacts.

In a step S230, the processor 110 may generate a first corrected image I3 using an artifact removal model. The first corrected image I3 may be sharper than the intermediate image I2 by the artifact removal.

In a step S240, the processor 110 may generate a second corrected image I4 using the first corrected image I3 and the blurred image I1. The second corrected image I4 may be a result of the correction of the details of the first corrected image I3, and the second corrected image I4 may be clearer and of better quality than the first corrected image I3.

The artifact removal model may remove the artifacts of the intermediate image by the convolutional neural network described with reference to FIGS. 4 to 7.

FIG. 11 is a table showing comparison between artifact removal performances according to convolutional neural network structures.

Referring to FIG. 11, when the artifacts are removed using the convolutional neural network shown in FIG. 4, the peak signal-to-noise ratio (PSNR) of the output image of the convolutional neural network is measured to be about 27.26 dB.

In the case that the convolutional neural network includes nodes N1, N2, N3, and N4 for summing the output result of the intermediate layer and the output result of the layer preceding the intermediate layer as shown in FIG. 5, the PSNR is measured to be about 29.42 dB. That is, the convolutional neural network shown in FIG. 5 may perform better than the convolutional neural network shown in FIG. 4.

In the case that the convolutional neural network includes the node Nf for summing the output result of the last layer and the input intermediate image data as shown in FIG. 6, the PSNR is measured to be about 29.58 dB. That is, the convolutional neural network shown in FIG. 6 may perform better than the convolutional neural networks shown in FIG. 4 and FIG. 5.

In the case that the convolutional neural network includes the nodes N1, N2, N3, and N4 for summing the output result of the intermediate layer and the output result of the layer preceding the intermediate layer, and the node Nf for summing the output result of the last layer and the input intermediate image data as shown in FIG. 7, the PSNR is measured to be about 29.85B. That is, the convolutional neural network shown in FIG. 7 may perform better than the convolutional neural networks shown in FIGS. 4 to 6.

FIGS. 12A to 12E illustrate images for explaining performance of an image processing method according to an exemplary embodiment of the present disclosure.

Figure 12C:
Figure 12D:
Figure 12E:
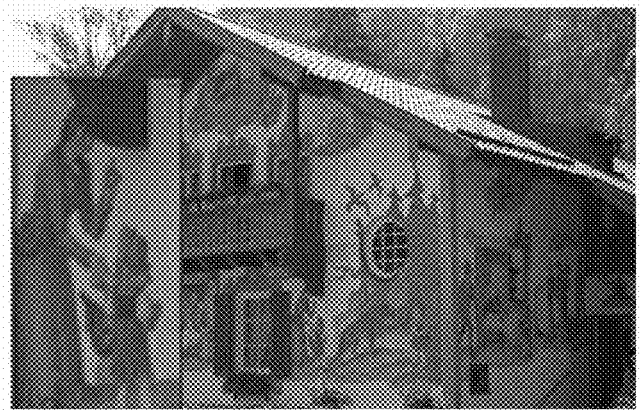

FIG. 12A shows a blurred image, and FIG. 12E shows a clear original image taken in an environment where there is little fluctuation and noises.

FIG. 12B shows a result of deconvoluting the blurred image by using a method proposed by U. Schmidt et al. in a thesis 'a discriminative non-blind deblurring' published in CVPR of 2013.

FIG. 12C shows a result of deconvoluting the blurred image by using a method proposed by C. J. Schuler et al., in a thesis 'a machine learning approach for non-blind image deconvolution' published in CVPR of 2013.

FIG. 12D shows a result of deconvoluting the blurred image by using the image processing method according to an exemplary embodiment of the present disclosure. The result shown in FIG. 12D is obtained by using the convolutional neural network illustrated in FIG. 7.

The left box in FIG. 12A, 12B, 12C, 12D, or 12E is an enlarged view of a part of each image, and the box in the lower right corner of FIG. 12A illustrates the blur kernel that produces blurring effects on the blurred image.

Referring to FIGS. 12A to 12D, in the case of FIG. 12B, the PSNR is only 29.20 dB although the sharpness is clearer than FIG. 12A, and the blurring effect may not be completely erased. Also, FIG. 12C is clearer than FIG. 12A, its PSNR is only 27.35 dB, and the blurring effect may not be completely erased.

Meanwhile, in the case of FIG. 12D obtained by the embodiment of the present disclosure, there is almost no difference from the clear original image shown in FIG. 12E as the blurring effect is almost eliminated. Also, its PSNR is 30.20 dB, and thus it shows remarkably improved quality as compared to the cases of FIGS. 12B and 12C.

FIGS. 13A to 13E illustrate other images for explaining performance of an image processing method according to an exemplary embodiment of the present disclosure.

Figure 13A:
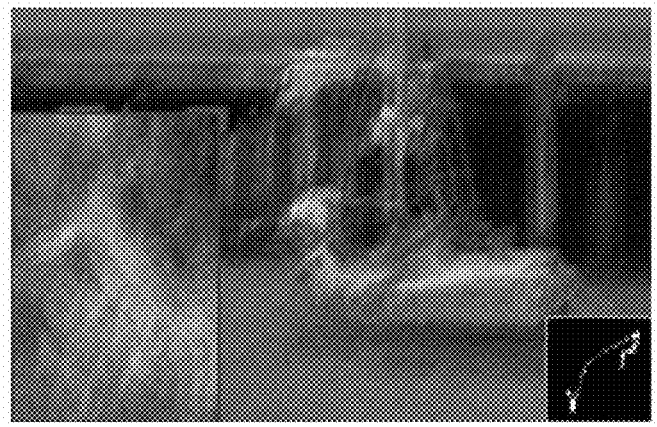
FIGS. 13A to 13E illustrate other images for explaining performance of an image processing method according to an exemplary embodiment of the present disclosure.
Figure 13B:
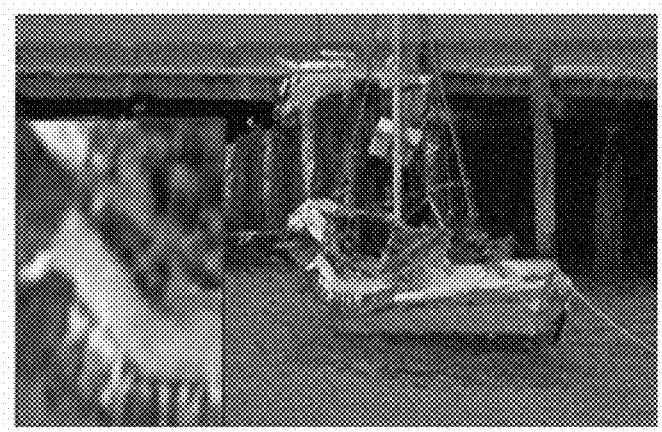
Figure 13C:
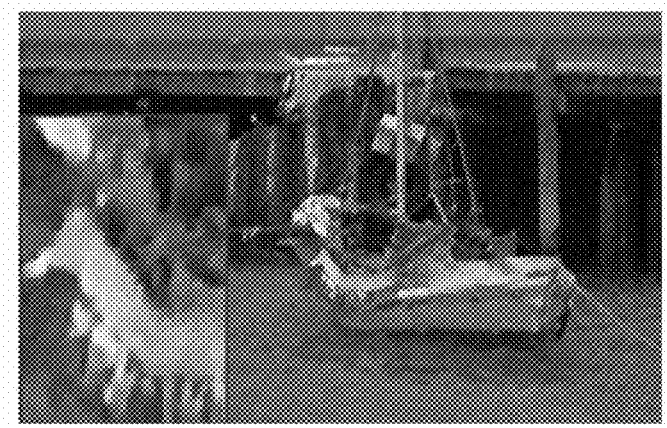
Figure 13D:
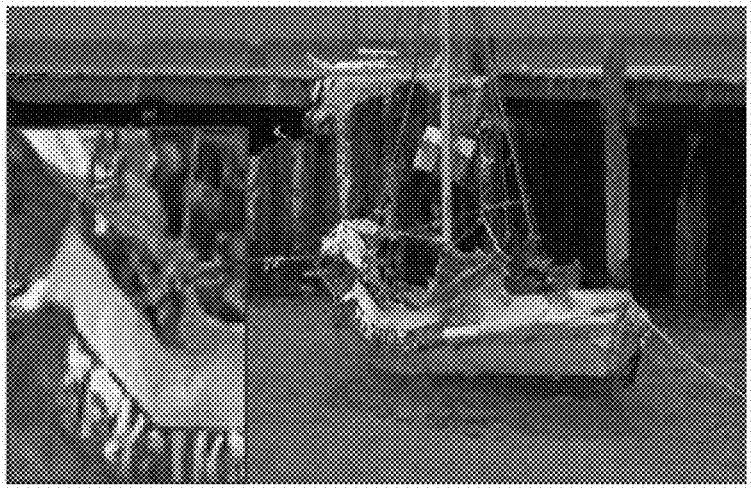
Figure 13E:
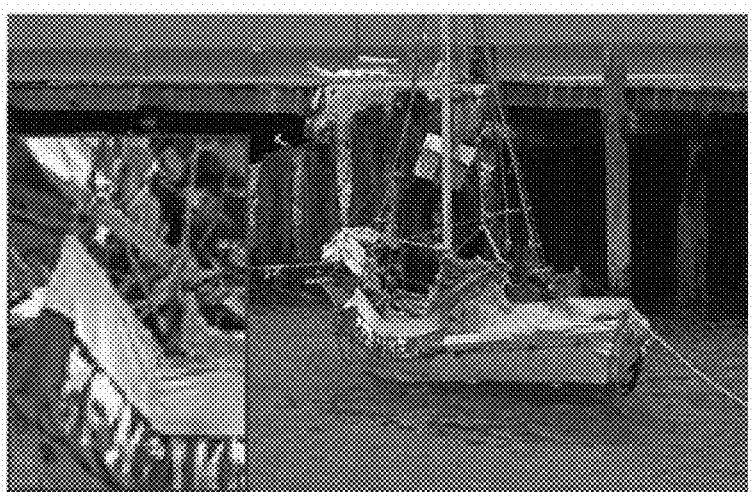

FIG. 13A shows a blurred image, and FIG. 13E shows a clear original image taken in an environment where there is little fluctuation and noises.

FIG. 13B shows a result of deconvoluting the blurred image by using the method proposed by U. Schmidt et al., and FIG. 13C shows a result of deconvoluting the blurred image by using the method proposed by C. J. Schuler et al.

FIG. 13D shows a result of deconvoluting the blurred image by using the image processing method according to an exemplary embodiment of the present disclosure. The result shown in FIG. 13D is obtained by using the convolutional neural network illustrated in FIG. 7.

The left box in FIG. 13A, 13B, 13C, 13D, or 13E is an enlarged view of a part of each image, and the box in the lower right corner of FIG. 13A illustrates the blur kernel that produces blurring effects on the blurred image.

Referring to FIGS. 13A to 13D, in the case of FIG. 13B, the PSNR is only 25.46 dB even though the sharpness is clearer than FIG. 13A, and the blurring effect may not be completely erased. Also, although FIG. 13C is clearer than FIG. 13A, its PSNR is only 25.83 dB, and the blurring effect may not be completely erased.

Meanwhile, in the case of FIG. 13D obtained by the embodiment of the present disclosure, there is almost no difference from the clear original image shown in FIG. 13E as the blurring effect is almost eliminated. Also, its PSNR is 27.85 dB, and thus it shows remarkably improved quality as compared to the cases of FIGS. 13B and 13C.

In the above description, the image processing apparatus 100, the machine learning method of the image processing apparatus 100, and the image processing method of the image processing apparatus 100 according to the exemplary embodiments of the present disclosure were explained with reference to FIGS. 1 to 13.

According to the disclosed embodiments, it is made possible to learn how to remove artifacts of an intermediate image without the image processing apparatus learning the direct deconvolution method. This feature facilitates machine learning of the image processing apparatus and can apply the results of the machine learning to images blurred by various blur kernels. Further, the structure of the convolutional neural network can be improved, and the accuracy of artifact removal can be enhanced. Further, the quality of the deconvolution can be improved by correcting the detail of the image from which the artifacts are removed.

The methods according to forms of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. A machine learning method in which an image processing apparatus learns image processing, the method comprising:
   receiving a clear test image;
   generating an intermediate image from a blurred test image modified from the clear test image, the intermediate image including artifacts with less sensitivity to changes in a blur kernel than the blurred test image; and
   generating an artifact removal model that removes artifacts of an image from a result of machine learning performed by using the intermediate image and the clear test image,
   wherein the artifact removal model is generated from the result of the machine learning using a convolutional neural network which includes at least one convolution layer for generating a plurality of characteristic maps using a plurality of convolution filters.

2. The machine learning method according to claim 1, further comprising generating the blurred test image from a sum of a convolution of the clear test image and the blur kernel and a noise.

3. The machine learning method according to claim 1, wherein the intermediate image is obtained by applying a Wiener filter to the blurred test image.

4. The machine learning method according to claim 3, wherein, in the generating the artifact removal model, a back propagation process of the convolutional neural network is performed in consideration of a regularization term obtained from a gradient of an output result of the convolutional neural network.

5. The machine learning method according to claim 1, wherein the convolutional neural network includes at least one node for summing an output result of an intermediate layer of the convolutional neural network and an output result of a layer preceding the intermediate layer.

6. The machine learning method according to claim 1, wherein the convolutional neural network includes a node for summing an output result of a last layer of the convolutional neural network and data of the intermediate image input to the convolutional neural network.

7. An image processing method performed in an image processing apparatus, the method comprising:
   receiving a blurred image;
   generating an intermediate image from the blurred image, the intermediate image including artifacts with less sensitivity to changes in a blur kernel than the blurred image; and
   generating a first corrected image by removing the artifacts of the intermediate image using an artifact removal model,
   wherein the artifact removal model removes the artifacts of the intermediate image by using a convolutional neural network which includes at least one convolution layer for generating a plurality of characteristic maps using a plurality of convolution filters.

8. The image processing method according to claim 7, wherein the intermediate image is obtained by applying a Wiener filter to the blurred image.

9. The image processing method according to claim 7, wherein the convolutional neural network includes at least one node for summing an output result of an intermediate layer of the convolutional neural network and an output result of a layer preceding the intermediate layer.

10. The image processing method according to claim 7, wherein the convolutional neural network includes a node for summing an output result of a last layer of the convolutional neural network and data of the intermediate image input to the convolutional neural network.

11. The image processing method according to claim 7, further comprising generating a second corrected image which corrects detail of the first corrected image, wherein the second corrected image satisfies a condition of minimizing a linear sum of a squared error of the blurred image and a convolution of the second corrected image and the blur kernel, and a squared error of the first corrected image and the second corrected image.

12. An image processing apparatus deconvoluting a blurred image, the apparatus comprising:
a processor; and
a memory storing at least one instruction executed by the processor,
wherein the at least one instruction is configured to receive a clear test image; generate, from a blurred test image modified from the clear test image, an intermediate training image with less sensitivity to changes in a blur kernel than the blurred test image; generate an artifact removal model from a result of machine learning performed by using the intermediate training image and the clear test image; generate, from the blurred image, an intermediate image including artifacts with less sensitivity to changes in a blur kernel than the blurred image; and generate a first corrected image by removing the artifacts of the intermediate image using the artifact removal model.

13. The image processing apparatus according to claim 12, wherein the at least one instruction is further configured to remove the artifacts of the intermediate image by using a convolutional neural network, and the convolutional neural network includes a node for summing an output result of a last layer of the convolutional neural network and data of the intermediate image input to the convolutional neural network.

14. The image processing apparatus according to claim 12, wherein the at least one instruction is further configured to remove the artifacts of the intermediate image by using a convolutional neural network, and the convolutional neural network includes at least one node for summing an output result of an intermediate layer of the convolutional neural network and an output result of a layer preceding the intermediate layer.

15. The image processing apparatus according to claim 12, wherein the at least one instruction is further configured to generate a second corrected image which corrects detail of the first corrected image, wherein the second corrected image satisfies a condition of minimizing a linear sum of a squared error of the blurred image and a convolution of the second corrected image and the blur kernel, and a squared error of the first corrected image and the second corrected image.

* * * * *